United States Patent
Zhang

(10) Patent No.: US 7,549,233 B2
(45) Date of Patent: Jun. 23, 2009

(54) ANGLE TESTING APPARATUS

(75) Inventor: Bing-Jun Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 68 days.

(21) Appl. No.: 11/874,916

(22) Filed: Oct. 19, 2007

(65) Prior Publication Data

US 2008/0163508 A1 Jul. 10, 2008

(30) Foreign Application Priority Data

Jan. 8, 2007 (CN) .......................... 2007 1 0200016

(51) Int. Cl.
  *G01B 5/24* (2006.01)
  *G01B 3/56* (2006.01)
  *G01B 7/30* (2006.01)
(52) U.S. Cl. ............................. 33/534; 33/1 N; 33/655; 33/549
(58) Field of Classification Search ................ 33/534, 33/1 N, 655, 549
See application file for complete search history.

(56) References Cited

U.S. PATENT DOCUMENTS

| | | | | |
|---|---|---|---|---|
| 3,996,670 A | * | 12/1976 | Joyal et al. | ............ 33/530 |
| 4,858,332 A | * | 8/1989 | Thomas | ............ 33/508 |
| 6,240,646 B1 | * | 6/2001 | Ronnmark et al. | ............ 33/1 PT |
| 6,425,188 B1 | * | 7/2002 | Danielli | ............ 33/547 |
| 6,525,938 B1 | | 2/2003 | Chen | |
| 6,722,050 B2 | * | 4/2004 | Winton, III | ............ 33/534 |
| 6,804,895 B2 | * | 10/2004 | Shapiro | ............ 33/471 |
| 2008/0141547 A1 | * | 6/2008 | Zhang et al. | ............ 33/534 |

* cited by examiner

*Primary Examiner*—Christopher W Fulton
(74) *Attorney, Agent, or Firm*—Frank R. Niranjan

(57) ABSTRACT

An angle testing apparatus for testing a angle between a first object and a second object includes a workbench, a fixing pole, a triggering member, a pair of contact poles, a controller, and an indicating assembly. The workbench is used for loading the second object thereon. The fixing pole protrudes up from the workbench. The triggering member has a first contact portion and a second contact portion, and is rotatably mounted to the fixing pole. The first contact portion is used for contacting the mounting portion of the second object. The contact poles are fixed at a special position on the workbench according to the desired angle range, for contacting the second contact portion when the mounting angle is not in the desired angle range. The controller is electrically connected to the fixing pole and the contact poles configured to send a signal based on connecting status between the second contact portion of the triggering member and the contact poles. The indicating assembly is electrically connected to the controller to indicate the testing result according to the signal.

14 Claims, 5 Drawing Sheets

ANGLE TESTING APPARATUS

BACKGROUND

1. Field of the Invention

The present invention relates to testing apparatuses. Particularly, the present invention relates to an angle testing apparatus for testing a mounting angle between two objects.

2. Description of Related Art

Electronic devices use heat dissipation assemblies attached to components thereof, for dissipating heat generated by the components to prevent the components from being overheated. Traditionally, a heat sink of a heat dissipation assembly is incorporated on a top of an electronic component, for guiding the heat from the component to spread to a much larger space, which benefits dissipation of the heat. Moreover, a fan is fixed on the heat sink for improving heat dissipation effect of the heat sink. Generally, the fan is fixed on the heat sink at a desired angle to obtain a better heat dissipation effect.

However, when manufacturing the heat sink, the desired angle should be found manually, which leads to an uncertain result, and even damages other components adjacent the heat sink. Consequently, an angle testing apparatus capable of automatically detecting the angle is needed in the industry.

SUMMARY

In one embodiment, an angle testing apparatus for testing whether a mounting angle between a first object and a second object is in a desired angle range or not, the second object having a mounting portion for mounting the first object, the angle testing apparatus includes a workbench, a fixing pole, a triggering member, a pair of contact poles, a controller, and an indicating assembly. The workbench is used for loading the second object thereon. The fixing pole protrudes up from the workbench. The triggering member is rotatably mounted to the fixing pole, with a first contact portion and a second contact portion located at opposite sides of the fixing pole respectively. The first contact portion is used for contacting the mounting portion of the second object. The pair of first and second contact poles are fixed at a special position on the workbench according to the desired angle range, for contacting the second contact portion of the triggering member when the mounting angle is not in the desired angle range. The controller is electrically connected to the fixing pole and the contact poles configured to send a signal based on connecting status between the second contact portion of the triggering member and the contact poles when the second object is moved on the workbench. The indicating assembly is electrically connected to the controller to indicate the testing result according to the signal.

Other advantages and novel features of the present angle testing apparatus will become more apparent from the following detailed description of preferred embodiment when taken in conjunction with the accompanying drawings, in which:

DETAILED DESCRIPTION

Figure 1:
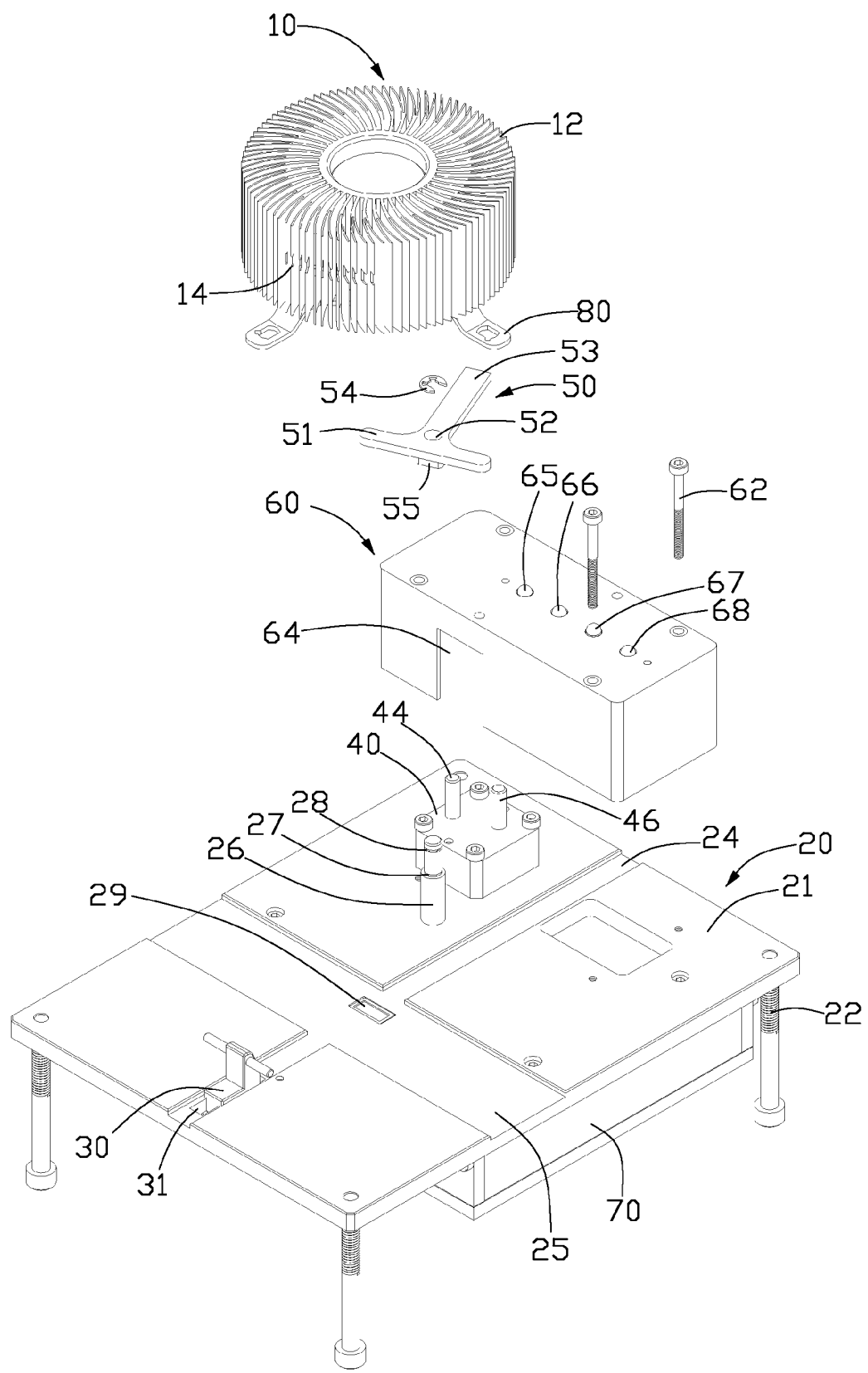
FIG. 1 is an exploded, isometric view of an angle testing apparatus in accordance with an embodiment of the present invention, together with a heat sink to be tested.

Referring to FIG. 1, an angle testing apparatus for checking a mounting angle between a heat sink 10 and a fan (not shown) in accordance with an embodiment of the present invention includes a workbench 20, a locating member 30, a triggering member 50, a cover 60, and a controller 70.

Figure 2:
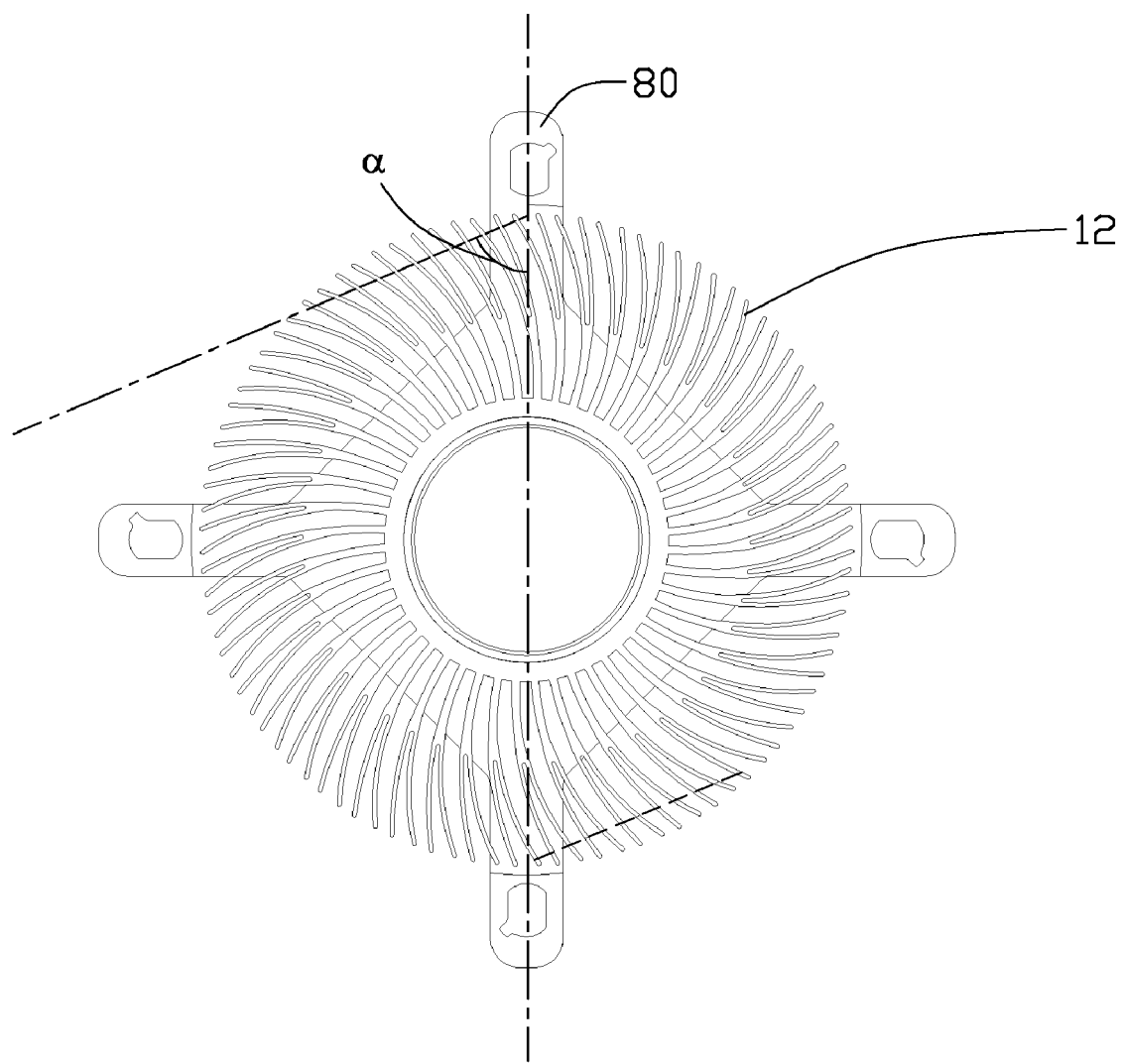
FIG. 2 is a top plan view of the heat sink of FIG. 1, showing an angle α to be tested.

Referring also to FIG. 2, the heat sink 10 is generally cylindrical, and includes a plurality of fins 12 arcing out from a central part thereof. Two opposing slots 14 are defined in a circumference of the heat sink 10, for receiving corresponding parts of the fan to fix the fan to a top of the heat sink 10. A bracket is fixed to a bottom of the heat sink 10. The bracket includes four arms 80 symmetrically extending out therefrom, every two adjacent arms 80 are perpendicular to each other. An end of the slot 14 extends above a corresponding arm 80 of the bracket, and overlaps a beeline between the corresponding arm 80 and an opposite arm 80. An angle α (see FIG. 2) between the extending direction of the slot 14 and the beeline is to be tested.

The workbench 20 includes a rectangular plate 21 and four legs 22 respectively extending down from four corners of the plate 21 for supporting the plate 21. The controller 70 is installed to a bottom of the plate 21 of the workbench 20 and performs calculations and signal processing. The plate 21 defines a first sliding slot 24 parallel to two sides thereof and extending from an end to an opposite end thereof, and a second sliding slot 25 parallel to ends thereof and extending from a side to an opposite side thereof, in the top surface thereof. The first sliding slot 24 intersects the second sliding slot 25. An installing hole 31 is defined in an end of the first sliding slot 24. A photosensitive switch 29, such as a photoresistor or a photodiode is located at an intersection of the first and second sliding slots 24, 25, and electrically connected to the controller 70. A protruding member 40 made of insulative materials is fixed on the plate 21 opposite to the installing hole 31, and located at a side of the first sliding slot 24. Two contact poles 44 and 46 are fixed on the protruding member 40. The contact poles 44 and 46 are electrically connected to the controller 70 at high voltage level, and arranged at two positions of the protruding member 40 depending on critical values of an eligible angle range of the angle α. A fixing pole 26 electrically connected to the controller 70 at a low voltage level protrudes up from the plate 21 adjacent the protruding member 40. The diameter of an upper portion of the fixing pole 26 is smaller than that of a lower portion of the fixing pole 26, with a shoulder 27 formed at the top of the lower portion. A circumferential groove 28 is defined in the upper portion of the fixing pole 26.

Figure 4:
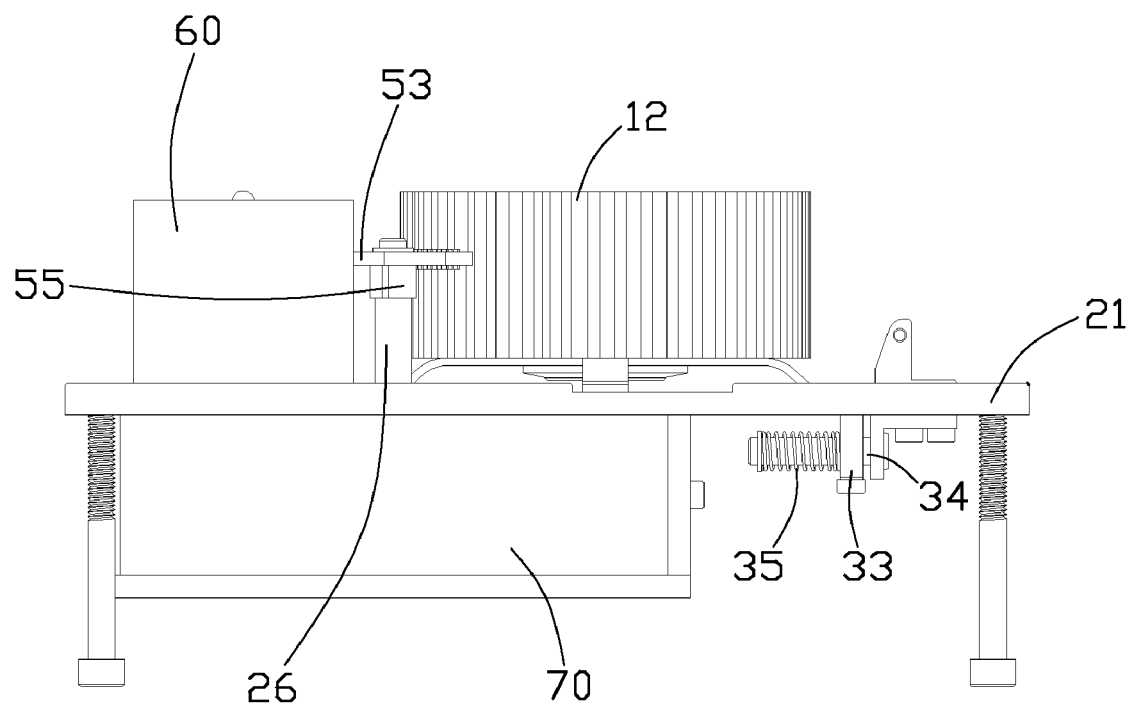
FIG. 4 is a left-side elevational view of FIG. 3.

Referring also to FIG. 4, the locating member 30 includes a limiting plate 33 protruding down from the bottom of the plate 21 and defining a through hole therein, a pin 34 slidably received in the through hole of the limiting plate 33, a locating portion fixed to an end of the pin 34 and passing through the installing hole 31 of the workbench 20, and an elastic member 35 fitting about the pin 34 and elastically located between the limiting plate 33 and the opposite end of the pin 34.

The triggering member 50 is T-shaped and includes a first contact portion 51 and a second contact portion 53 perpendicular to the first contact portion 51. A protrusion 55 protrudes down from the center of the first contact portion 51. A pivot hole 52 is defined in the intersection of the first and second contact portions 51, 53. The triggering member 50 further includes a contact surface at a distal end of the first contact portion 51.

The cover 60 is rectangular with an open bottom. A cutout 64 is defined in a bottom of a sidewall of the cover 60. Four indicators 65-68 are fixed on the top wall of the cover 60 and electrically connected to the controller 70.

Figure 3:
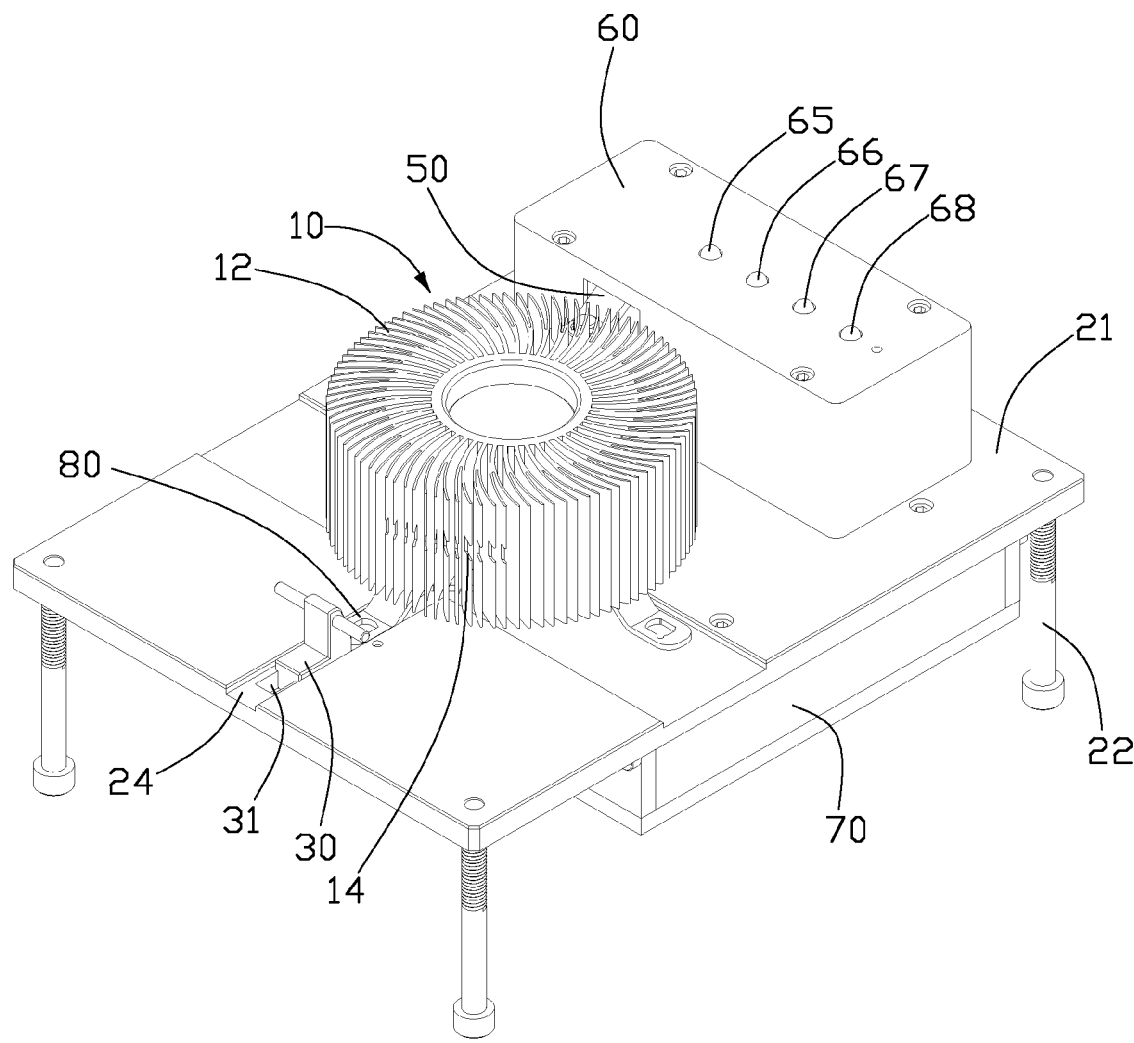
FIG. 3 is an assembled view of FIG. 1.

Referring also to FIGS. 3 and 4, in assembly, the triggering member 50 fits about the fixing pole 26 via the pivot hole 52 thereof, and the protrusion 55 is supported on the shoulder 27 of the fixing pole 26. A clip 54 is engaged in the groove 28 of the fixing pole 26 to prevent the triggering member 50 from disengaging from the fixing pole 26. Thus, the triggering member 50 is rotatably mounted to the fixing pole 26. The distal end of the second contact portion 53 of the triggering member 50 is located on the protruding member 40 between the contact poles 44, 46. The cover 60 is mounted to the plate 21 of the workbench 20 via screws 62, covering the protruding member 40 and a part of the second contact portion 53 of the triggering member 50. The cutout 64 of the cover 60 allows the second contact portion 53 passing therethrough. Thus, the first contact portion 51 is located out of the cover 60.

In assembling the heat sink 10, the locating member 30 is driven to move Away from the photosensitive switch 29, and the elastic member 35 is elastically compressed. The arms 80 of the bracket mounted to the heat sink 10 are placed in the corresponding first and second sliding slots 24, 25. The locating member 30 is released. The elastic member 35 rebounds to drive the pin 34 together with the locating portion of the locating member 30 to move toward the heat sink 10. The heat sink 10 is moved together with the locating portion of the locating member 30 when the locating portion elastically contacts the corresponding arm 80 of the bracket. The triggering member 50 is driven to rotate about the fixing pole 26 when the heat sink 10 contacts the first contact portion 51 thereof, until a corresponding slot 14 aligns with the first contact portion 51 of the triggering member 50. Thus, the first contact portion 51 is received in the slot 14 of the heat sink 10, with the contact surface thereof contacting the bottom surface of the slot 14. In use, because the photosensitive switch 29 is shaded by the heat sink 10, a signal is generated by the photosensitive switch 29 to drive the controller 70. The indicator 68 lights up to indicate the electric source of the controller 70 is on.

Figure 5:
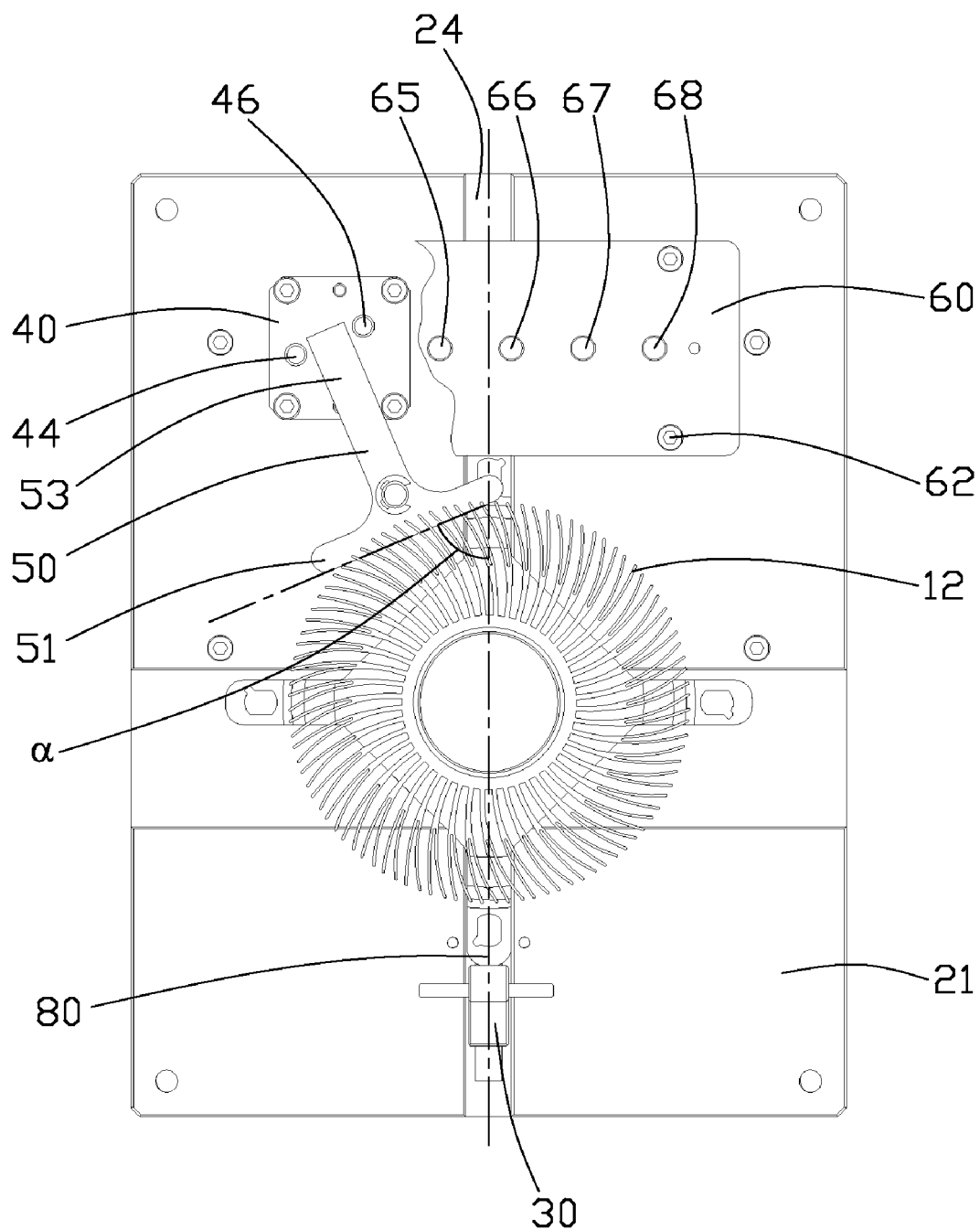
FIG. 5 is a top plan view of FIG. 3.

Referring to FIG. 5, when the angle α of the heat sink 10 is less than or equal to a minimum value of the angle range, the second contact portion 53 of the triggering member 50 contacts the first contact pole 44. Thus, the first contact pole 44, the controller 70, and the fixing pole 26 are electrically connected through the triggering member 50, and the controller 70 drives the indicator 65 to light to indicate the angle α is less than or equal to the minimum value of the angle range. In other words, the heat sink 10 is unqualified.

When the angle α of the heat sink 10 is larger than or equal to a maximum value of the angle range, the second contact portion 53 of the triggering member 50 contacts the second contact pole 46. Thus, the second contact pole 46, the controller 70, and the fixing pole 26 are electrically connected through the triggering member 50, and the controller 70 drives the indicator 66 to light to indicate the angle α is larger than or equal to the maximum value of the angle range. In other words, the heat sink 10 is unqualified.

When the angle α of the heat sink 10 is between the maximum value and the minimum value of the angle range, the second contact portion 53 of the triggering member 50 contacts neither the first contact pole 44 nor the second pole 46, and the controller 70 drives the indicator 67 to light to indicate the angle α is in the angle range. In other words, the heat sink 10 is qualified.

After testing, the heat sink 10 is removed from the workbench 20, the photosensitive switch 29 is exposed, the angle testing apparatus turns off.

The angle testing apparatus can be used not only for testing the heat sink, but also for checking other objects that have angles to be detected. The indicators 65, 66, 67, and 68 can be configured to emit different colors, for example, green for qualified, red for unqualified. The lights 65, 66, 67, and 68 can be substituted with other indicating devices with alerting functions, such as buzzers, or displays.

It is believed that the present embodiments and their advantage will be understood from the foregoing description, and it will be apparent that various changes may be made thereto without departing from the spirit and scope of the invention or sacrificing all of its material advantages, the examples hereinbefore described merely being exemplary embodiments of the invention.

What is claimed is:

1. An angle testing apparatus for testing whether a mounting angle between a first object and a second object is in a desired angle range or not, the second object having a mounting portion for mounting the first object, the angle testing apparatus comprising:
    a workbench configured for loading the second object thereon;
    a fixing pole extending up from the workbench;
    a triggering member rotatably mounted to the fixing pole, with a first contact portion and a second contact portion located at opposite sides of the fixing pole, the first contact portion configured for contacting the mounting portion of the second object;
    a pair of first and second contact poles fixed at predetermined positions on the workbench respectively according to a minimum value and a maximum value of the desired angle range, for contacting the second contact portion of the triggering member when the mounting angle is not in the desired angle range;
    a controller electrically connected to the fixing pole and the contact poles configured to send a signal based on connecting status between the second contact portion of the triggering member and the contact poles when the second object is moved on the workbench; and
    an indicating assembly electrically connected to the controller to indicate the testing result according to the signal.

2. The angle testing apparatus as described in claim 1, wherein the triggering member defines a pivot hole in an intersection of the first and second contact portions thereof, for rotatably fitting about the fixing pole.

3. The angle testing apparatus as described in claim 1, further comprising a locating member installed on the workbench, wherein the locating member comprises a movable locating portion configured for locating the second object together with the first contact portion of the triggering member.

4. The angle testing apparatus as described in claim 3, wherein the locating member further comprises a limiting plate immovably fixed to the workbench, a pin slidably passing through the limiting plate, and an elastic member fitting about the pin and elastically located between the limiting plate and an end of the pin, the locating portion is fixed to an opposite end of the pin.

5. The angle testing apparatus as described in claim 4, wherein an installing hole is defined in the workbench, an upper part of the locating portion of the locating member extends through the installing hole.

6. The angle testing apparatus as described in claim 1, further comprising a photosensitive switch configured for generating a start signal when the second object is loaded on the workbench and sending the start signal to the controller.

7. The angle testing apparatus as described in claim 6, wherein the second contacting portion of the triggering member is located between the first and second contact poles, the indicator assembly indicates the mounting angle is smaller than or equal to a minimum value of the desired angle range when the second contacting portion contacts and is electrically connected to the first contact pole, and indicates the mounting angle is larger than or equal to a maximum value of the desired angle range when the contacting portion contacts and is electrically connected to the second contact pole.

8. An angle testing apparatus for testing a mounting angle between a first line and a second line extending through an object, the lines crossing with each other at different planes, the angle testing apparatus comprising:
   a workbench for loading the object in such a manner that the object is slidable on the workbench along one of the lines;
   a fixing pole fixed on the workbench, a first predetermined voltage level being applied to the fixing pole;
   at least one contact pole fixed on a predetermined position of the workbench, a second predetermined voltage level being applied to said at least one contact pole;
   a triggering member rotatably mounted to the fixing pole and matchable with the other one of the lines of the object, the triggering member being rotatable about the fixing pole, when being pushed by the object, to selectively electrically connect or disconnect the fixing pole with the at least one contact pole based on the mounting angle of the object; and
   an indicator for giving out instruction according to the connection of the fixing pole, the at least one contact pole, and the triggering member.

9. The angle testing apparatus as described in claim 8, wherein when the fixing pole, said at least one contact pole, and the triggering member are electrically connected the instruction is given out to indicate that the mounting angle of the object is unqualified.

10. The angle testing apparatus as described in claim 8, wherein the predetermined position, where said at least one contact pole is fixed, is determined according to a desired maximum and/or minimum tolerance of the angle.

11. The angle testing apparatus as described in claim 8, wherein the triggering member comprises two contact portions respectively configured for contacting the object and said at least one contact pole.

12. The angle testing apparatus as described in claim 8, further comprising a controller configured for providing the predetermined voltage levels for the fixing pole and said at least one contact pole and sending a signal according to the connection of the fixing pole, the at least one contact pole, and the triggering member to the indicator.

13. The angle testing apparatus as described in claim 8, further comprising a locating member slidably installed on the workbench, the object is clamped between the locating member and the triggering member when fixed on the workbench.

14. The angle testing apparatus as described in claim 13, wherein the locating member comprises:
   a limiting plate immovably fixed on a first side of the workbench;
   a pin slidably penetrating the limiting plate on the first side of the platform;
   a locating portion fixed to the pin and penetrating the workbench from the first side to a second side thereof configured to locate the object; and
   an elastic member sleeving the pin on the first side of the workbench, two ends of the elastic member being respectively fixed to the limiting plate and the pin.

* * * * *